(12) United States Patent  
Park

(10) Patent No.: US 9,455,585 B2  
(45) Date of Patent: Sep. 27, 2016

(54) CHARGING APPARATUS AND WIRELESS CHARGING APPARATUS

(71) Applicant: SAMSUNG ELECTRO-MECHANICS CO., LTD., Suwon-Si, Gyeonggi-Do (KR)

(72) Inventor: Yong Woon Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 180 days.

(21) Appl. No.: 14/293,760

(22) Filed: Jun. 2, 2014

(65) Prior Publication Data

US 2015/0180253 A1    Jun. 25, 2015

(30) Foreign Application Priority Data

Dec. 20, 2013    (KR) .................. 10-2013-0160334

(51) Int. Cl.
  *H02J 7/00* (2006.01)
  *H02J 50/00* (2016.01)
  *H02J 7/02* (2016.01)

(52) U.S. Cl.
  CPC ............ *H02J 7/0047* (2013.01); *H02J 7/0021* (2013.01); *H02J 7/025* (2013.01); *H02J 7/027* (2013.01); *H02J 50/00* (2016.02); *H02J 2007/0049* (2013.01)

(58) Field of Classification Search
  None
  See application file for complete search history.

(56) References Cited

U.S. PATENT DOCUMENTS

| | | | | | |
|---|---|---|---|---|---|
| 4,792,743 | A | * | 12/1988 | Tsujino ................. | H02J 7/0031 320/124 |
| 5,726,555 | A | * | 3/1998 | Takamoro ............. | H02J 7/0047 320/106 |
| 6,501,247 | B2 | * | 12/2002 | Kaite ................... | G01R 31/362 320/133 |
| 7,039,534 | B1 | * | 5/2006 | Ryno ............... | G01R 19/16542 320/134 |
| 8,860,376 | B2 | * | 10/2014 | Kimura ............... | H01M 10/443 320/150 |
| 9,236,759 | B2 | * | 1/2016 | Park ........................ | H02J 7/025 |
| 2001/0017533 | A1 | | 8/2001 | Kaite et al. | |
| 2010/0176768 | A1 | * | 7/2010 | Kimura .............. | H01M 10/443 320/152 |

FOREIGN PATENT DOCUMENTS

| | | |
|---|---|---|
| EP | 0 731 546 A1 | 9/1996 |
| KR | 10-2009-0113732 A | 11/2009 |
| KR | 10-2010-0015828 A | 2/2010 |
| KR | 10-2013-0074889 A | 7/2013 |
| WO | 2008/133806 A1 | 11/2008 |

OTHER PUBLICATIONS

Extended European Search Report dated Sep. 2, 2014 issued in the corresponding European Patent Application No. 14275132.0.

* cited by examiner

*Primary Examiner* — Leigh Garbowski

(74) *Attorney, Agent, or Firm* — NSIP Law

(57) ABSTRACT

A charging apparatus may include a power supply unit supplying charging power, a charging unit transferring the charging power from the power supply unit to an external charging target device, a charge controlling unit controlling a charging state of the charging unit, a display unit displaying the charging state according to controlling by the charge controlling unit and stopping a displaying operation when the charging target device is in a fully-charged state, and a delaying unit blocking a current supplied to the display unit and delaying the stopping of the displaying operation of the display unit for a preset time when the charging target device is recharged in the fully-charged state.

7 Claims, 5 Drawing Sheets

CHARGING APPARATUS AND WIRELESS CHARGING APPARATUS

CROSS-REFERENCE TO RELATED APPLICATION

This application claims the benefit of Korean Patent Application No. 10-2013-0160334 filed on Dec. 20, 2013, with the Korean Intellectual Property Office, the disclosure of which is incorporated herein by reference.

BACKGROUND

The present disclosure relates to a charging apparatus and a wireless charging apparatus capable of easily displaying a charged state of a device.

Generally, in order to drive an electronic apparatus, a power supply apparatus supplying driving power is required.

Such a power supply apparatus may generally convert commercially-available alternating current power into direct current power, driving power, and may supply the driving power to the electronic apparatus.

As described above, in the case in which a rechargeable battery storing power to supply driving power to the electronic apparatus is adopted for use in an electronic apparatus, a charging apparatus is commonly used to supply power to the rechargeable battery.

Such a charging apparatus may supply power to the rechargeable battery embedded in the electronic apparatus in a scheme of being directly connected to the electronic apparatus by a connector or the like or may supply power to the rechargeable battery embedded in the electronic apparatus in a non-contact scheme by a magnetic induction effect or a magnetic resonance effect.

The charging apparatus described above may include a display unit such as a light emitting diode illuminated liquid crystal display (LCD) to display a device charging state.

When a fully charged electronic apparatus is controlled for a predetermined amount of time and is then connected to the power supply apparatus, a monochromatic light emitting diode may not display a full-charged state of the fully charged electronic apparatus. In the case in which a plurality of light emitting diodes are used in order to display the full-charged state of a device as described in the following Related Art Document, manufacturing costs for configuring the plurality of light emitting diodes may be increased.

RELATED ART DOCUMENT

Korean Patent Laid-Open Publication No. 10-2009-0113732

SUMMARY

Some embodiments of the present disclosure provides a charging apparatus and a wireless charging apparatus allowing for a fully charged state of a device to be displayed by a monochromatic display apparatus when a fully charged device is recharged.

According to some embodiments of the present disclosure, a charging apparatus may include: a power supply unit supplying charging power; a charging unit transferring the charging power from the power supply unit to an external charging target device; a charge controlling unit controlling a charging state of the charging unit; a display unit displaying the charging state according to controlling by the charge controlling unit and stopping a displaying operation when the charging target device is in a fully-charged state; and a delaying unit blocking a current supplied to the display unit and delaying the stopping of the displaying operation of the display unit for a preset time when the charging target device is recharged in the fully-charged state.

The display unit may be a monochromatic light emitting diode.

The charging apparatus may further include a detecting unit detecting a state of the charging power transferred from the power supply unit to the charging unit.

The display unit may emit light having a preset color while the charging target device is being charged and may stop a light emission operation when the charging target device is fully charged.

The delaying unit may include: a switch connected between a cathode of the monochromatic light emitting diode supplied with driving power and a ground in series; a first resistor connected between a first control signal of the charge controlling unit and a drain of the switch; a diode connected between the drain of the switch and the first resistor to transfer the control signal; a second resistor connected between a second control signal of the charge controlling unit and a gate of the switch; a capacitor connected between the gate of the switch and the second resistor; and a third resistor connected between the gate of the switch and the ground, wherein the second resistor, the third resistor, and the capacitor determine the delay time together with a gate-source threshold voltage of the switch.

According to some embodiments of the present disclosure, a charging apparatus may include: a power supply unit supplying charging power; a charging unit transferring the charging power from the power supply unit to an external charging target device in a preset wireless scheme; a charge controlling unit controlling a charging state of the charging unit; a display unit displaying the charging state according to controlling by the charge controlling unit and stopping a displaying operation when the charging target device is in a fully-charged state; and a delaying unit blocking a current supplied to the display unit and delaying the stopping of the displaying operation of the display unit for a preset time when the charging target device is recharged in the fully-charged state.

The charging unit may include: a coil unit transferring the charging power to the charging target device according to magnetic induction effect; and a switching unit controlling a power transfer operation of the coil unit.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
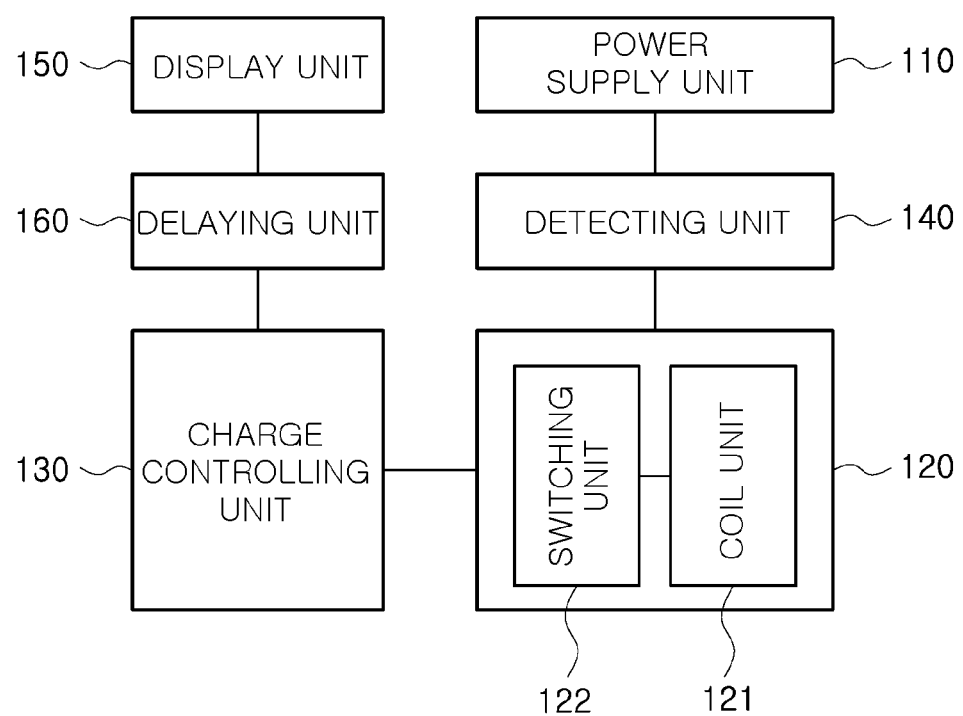
FIG. 1 is a schematic block diagram of a charging apparatus according to an exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Throughout the drawings, the same or like reference numerals will be used to designate the same or like elements.

FIG. 1 is a schematic block diagram of a charging apparatus according to an exemplary embodiment of the present disclosure.

Referring to FIG. 1, a charging apparatus 100 according to an exemplary embodiment of the present disclosure may include a power supply unit 110, a charging unit 120, a charge controlling unit 130, a detecting unit 140, a display unit 150, and a delaying unit 160.

The power supply unit 110 may supply charging power having a preset level and may convert input power into charging power although not shown in the accompanying drawing, and the input power may be commercially-available alternating current power or direct current power.

To this end, although not shown, the power supply unit 110 may include a rectifying circuit rectifying the commercially-available alternating current power, a power factor correcting circuit correcting a power factor by adjusting a phase difference between a voltage and a current of the rectified power, and the like.

The charging unit 120 may supply the charging power from the power supply unit 110 to an external charging target device.

In the case in which the charging apparatus according to an exemplary embodiment of the present disclosure is a wired charging apparatus, the charging unit 120 may supply the charging power to the charging target device connected to a connection terminal such as a connector, and in the case in which the charging apparatus according to an exemplary embodiment of the present disclosure is a wireless charging apparatus, the charging unit 120 may supply the charging power to the charging target device by a preset magnetic induction or magnetic resonance scheme.

To this end, the charging unit 120 may include a coil unit 121 and a switching unit 122.

The coil unit 121 may include at least one coil and may supply the charging power to the charging target device by the preset magnetic induction or magnetic resonance scheme.

To this end, the charging target device may also include a receiving circuit for receiving the charging power from the coil unit 121 by the magnetic induction or magnetic resonance scheme.

The coil unit 121 may include a plurality of coils depending on a voltage level of the charging power to be supplied.

The switching unit 122 may switch an amplification operation of the coil unit 121 and may include switches corresponding to the number of coils of the coil unit 121.

A switching operation of the switching unit 122 may be controlled by the charge controlling unit 130.

The charge controlling unit 130 may control a charging operation of the charging unit 120 and may additionally control a display of a charging state of the charging target device.

To this end, the charge controlling unit 130 may be a microprocessor having software code input thereto, to perform the above-mentioned operations.

The charge controlling unit 130 may control the following five modes of charging operations.

A first mode may be a standby mode in which only power is connected and charging is not performed, a second mode may be a power supply mode in which charging is being performed, a third mode may be a full-charge mode in which charging is completed, a fourth mode may be a fault mode indicating an abnormal operation such as a temperature increase, or the like at the time of the charging, and a fifth mode may be a foreign object detection (FOD) mode detecting interference of a foreign object such as a conductor, between the charging apparatus and the charging target device at the time of the charging operation to indicate an operation error.

The detecting unit 140 may detect a state of charging power transferred from the power supply unit 110 to the charging unit 120, and in more detail, may detect whether the charging power transferred from the power supply unit 110 to the charging unit 120 corresponds to a preset normal state or a shunt state.

The display unit 150 may display the charging state of the charging target device depending on a charging display control of the charge controlling unit 130.

In further detail, the display unit 150 may be a monochromatic light emitting diode. Depending on the charging display control of the charging control unit 130, the display unit 150 may emit light having a preset color in the case in which the charging target device is being charged and may stop the light emission in the case in which the charging target device is in the fully-charged state.

In the case in which the charging target device is in the fully-charged state in which it is fully charged, the display unit 150 may stop the light emission by the control of the charge controlling unit 130, but in the case in which the charging is performed for the charging target device in a state in which the charging is completed by another charging device, since the light emission operation is stopped, it may be difficult to accurately display whether the charging target device and the charging apparatus are normally operated or whether the charging target device is in the fully-charged state.

Therefore, the delaying unit 160 may delay a light emission stop operation of the display unit 150.

Figure 2:
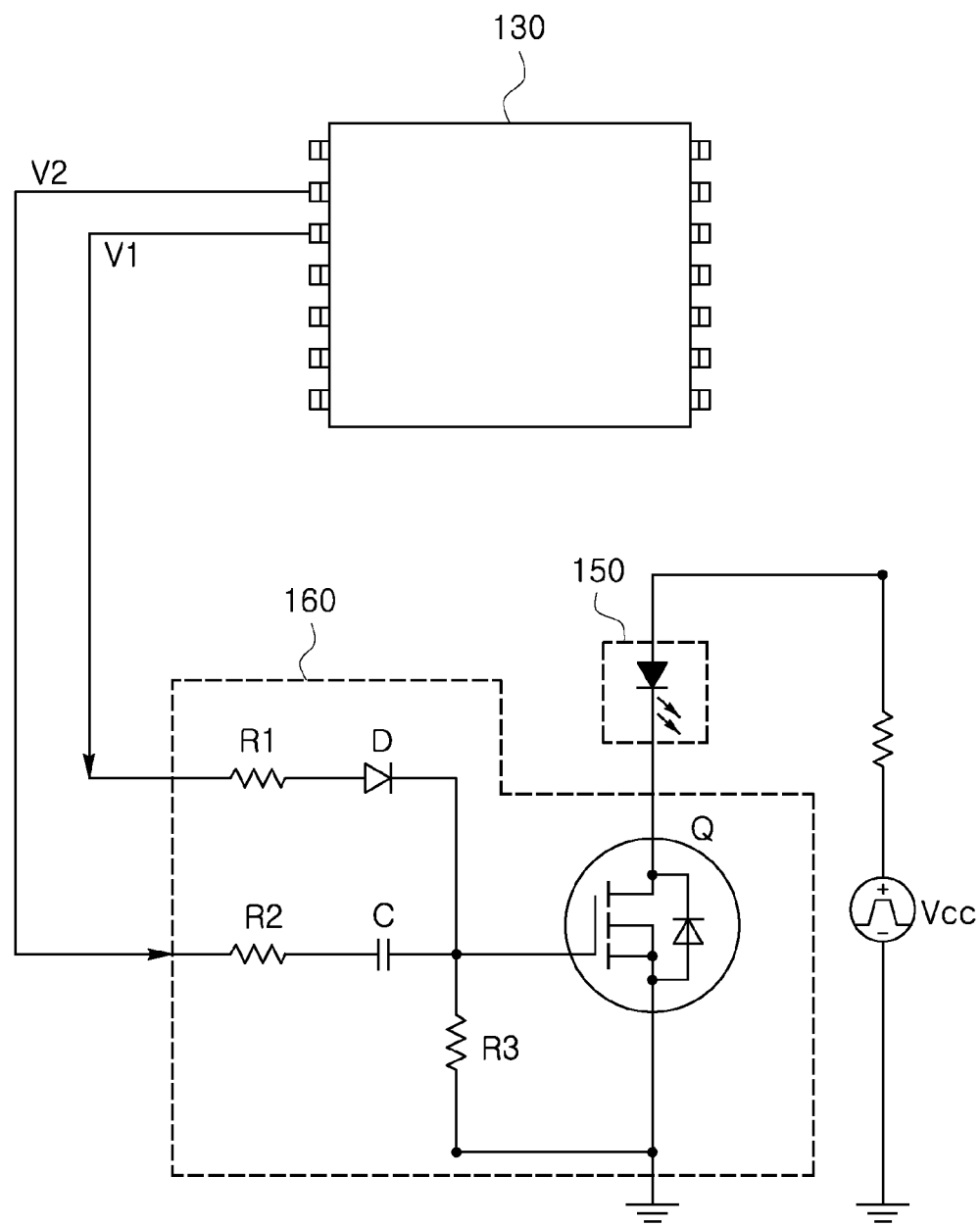
FIGS. 2 and 3 are circuit diagrams schematically illustrating one portion of the charging apparatus according to an exemplary embodiment of the present disclosure.
Figure 3:
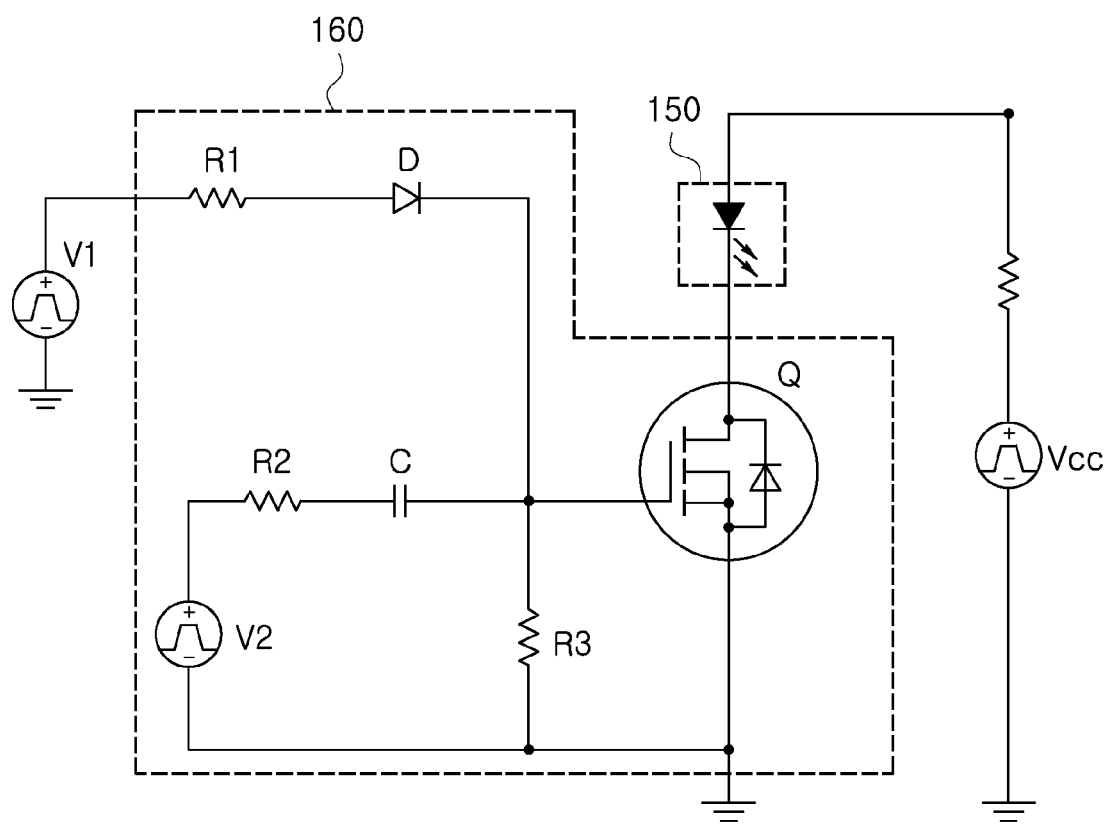

FIGS. 2 and 3 are circuit diagrams schematically illustrating one portion of the charging apparatus according to an exemplary embodiment of the present disclosure.

FIG. 2 is a circuit diagram schematically illustrating the charge controlling unit 130, the display unit 150, and the delaying unit 160 of the charging apparatus according to an exemplary embodiment of the present disclosure and FIG. 3 is a schematic circuit diagram providing a simulation operation waveform of the display unit 150 and the delaying unit 160 of the charging apparatus according to an exemplary embodiment of the present disclosure illustrated in FIG. 2.

Referring to FIGS. 2 and 3, the delaying unit 160 may include first, second and third resistors R1, R2 and R3, a diode D, a capacitor C, and a switch Q.

Driving power Vcc may be input to an anode of a monochromatic light emitting diode of the display unit 150 and a cathode of the monochromatic light emitting diode of the display unit 150 may be connected to a drain of the switch Q in series, and a source of the switch Q may be connected to a ground. The switch Q may be an n-type metal oxide semiconductor field effect transistor (MOS FET).

One terminal of the first resistor R1 may be connected to a signal terminal transferring a first control signal V1 of signals of the charge controlling unit 130, an anode of the diode D may be connected to the other terminal of the first resistor R1, and the cathode of the diode D may be connected to a gate of the switch Q to thereby provide a path by which a second control signal V2 is input to the gate of the switch Q.

One terminal of the second resistor R2 may be connected to the signal terminal transferring the first control signal V1 of the signals of the charge controlling unit 130, the capacitor C may be connected between the other terminal of the second resistor R2 and the gate of the switch Q in series, and a third resistor R3 may be connected between the gate and the source of the switch Q in parallel.

Figure 4:
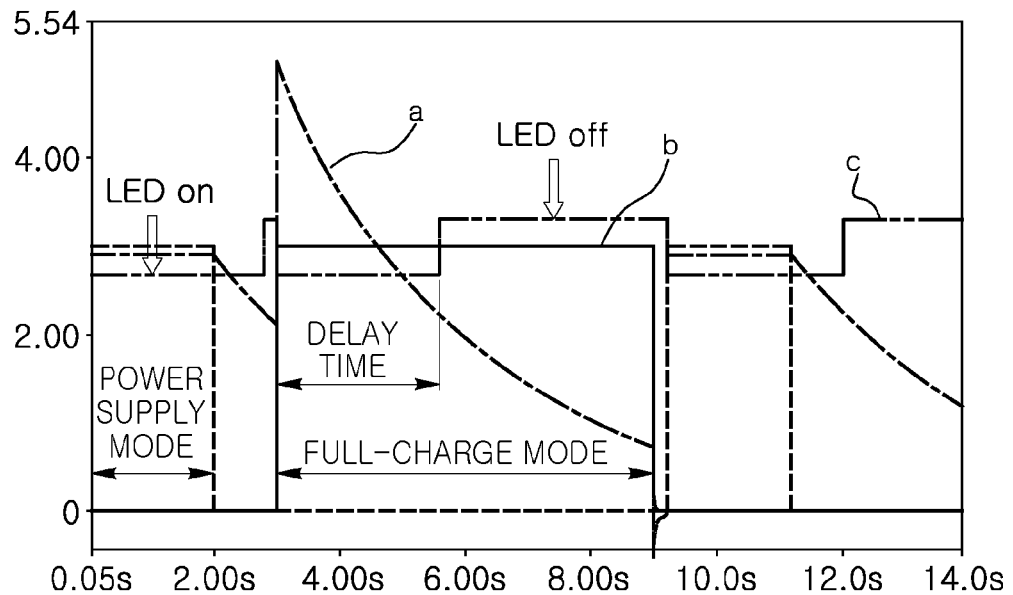
FIGS. 4 through 6 are graphs illustrating electrical characteristics by one portion of the charging apparatus according to the exemplary embodiment of the present disclosure illustrated in FIGS. 2 and 3.
Figure 5:
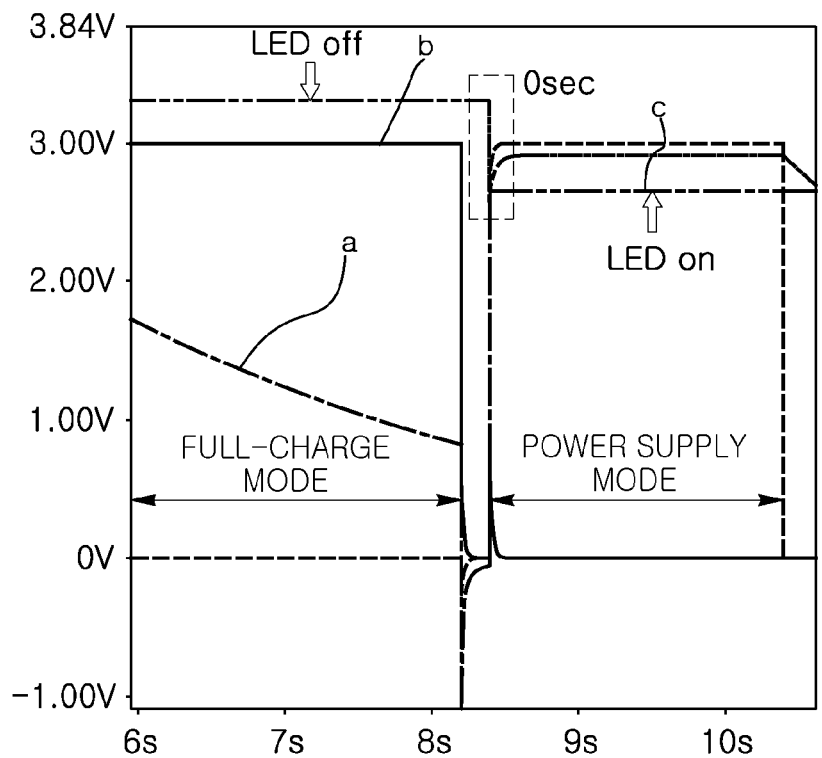
Figure 6:
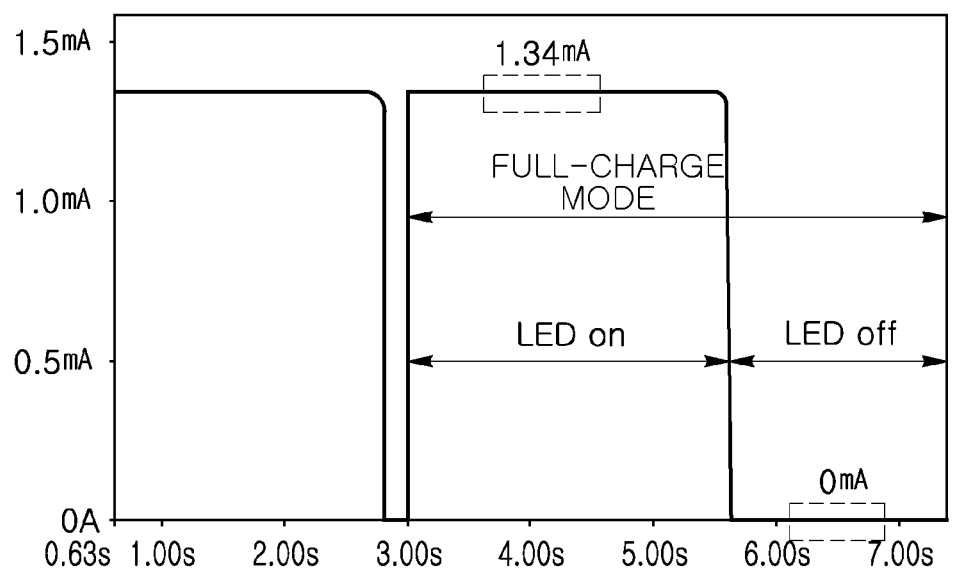

FIGS. 4 through 6 are graphs illustrating electrical characteristics by one portion of the charging apparatus according to an exemplary embodiment of the present disclosure illustrated in FIGS. 2 and 3.

Referring to FIGS. 3 and 4, the charging operation mode may be displayed by the first and second control signals V1 and V2 from the charge controlling unit 130.

For example, when signal levels of the first and second control signals V1 and V2 are respectively at a low level, the standby mode which is the first mode may be displayed, when the signal level of the first control signal V1 is at a high level and the signal level of the second control signal V2 is at a low level, the power supply mode which is the second mode may be displayed, and when the signal level of the first control signal V1 is at a low level and the signal level of the second control signal V2 is at a high level, the full-charge mode which is the third mode may be displayed.

The capacitor C may be connected between the second resistor R2 and a gate terminal of the switch Q in series to function as a coupling capacitor. When the mode becomes the full-charge mode, the voltage level of the second control signal V2 transferred to the capacitor C connected to the gate terminal of the switch Q may be increased based on a voltage level of the first control signal V1, as a reference voltage, input to the gate terminal of the switch Q and an increased voltage of the gate terminal may be then discharged, such that the monochromatic light emitting diode of the display unit 150 may be turned on until it reaches 2.3V, for example, and may then be turned off.

The third resistor R3 may form a discharge path of the voltage of the gate terminal and may further perform a high pass filter function to remove a low frequency noise component of several MHz.

A time constant of the capacitor C may be adjusted together with the second and third resistors R2 and R3, such that the delay time described above may be adjusted.

Referring to FIG. 4, the monochromatic light emitting diode of the display unit 150 is turned on for a predetermined time by the first control signal V1 (a) and the second control signal V2 (b) and is then turned off (c). Therefore, a signal transfer is delayed (b and c) depending on a delay time determined by a gate-source threshold voltage of the switch Q and the time constant of the second and third resistors R2 and R3 and the capacitor C, such that the light emitting diode may be turned on for a predetermined time even at the time of the recharging of the charging target device of the fully-charged state and may be then automatically turned off to display the fully-charged state.

Referring to FIG. 5, it may be seen that the monochromatic light emitting diode of the display unit 150 is turned on without having the delay time when the charging target device consumes power in the full-charge mode and again enters the power supply mode.

In addition, referring to FIG. 6, in the case in which a current of a drain terminal of the switch Q is measured in the full-charge mode, when the monochromatic light emitting diode of the display unit 150 is turned on, the current of 1.34 mA is consumed, while when the monochromatic light emitting diode of the display unit 150 is turned off, the consumed current is 0 mA, and power usage efficiency may be increased.

According to exemplary embodiments of the present disclosure, since the display apparatus is turned on for the predetermined amount of time and is then is turned off at the time of the recharging of the fully charged device, the fully-charged state of the device may be easily displayed even by the monochromatic display apparatus, and since the monochromatic display apparatus is used, manufacturing costs may be reduced.

In addition, although microprocessors are mainly used to control the operation of the display apparatus, according to some embodiments of the present disclosure, the operation of the display apparatus may be controlled only by a simple passive circuit without changing the software code because the control of the microprocessor is excluded, whereby a limited memory capacity of the microprocessor may be efficiently used.

In addition, when being switched from the fully charged state of a device to a charging state, the switching to the power supply mode may be performed without a delay time to display the operational state of the charging apparatus without having the delay, and when the light emitting diode is turned off in the fully-charged state, the current supply may be blocked and the consumed current may be reduced, such that the power usage efficiency may be increased.

According to exemplary embodiments of the present disclosure, since the display apparatus is turned on for a predetermined time and is then turned off when a fully charged device is recharged, the fully-charged state of the device may be easily displayed even by a monochromatic display apparatus, and since such a monochromatic display apparatus is used, manufacturing costs may be reduced.

In addition, when being switched from the fully charged state of a device to a charging state, the delay time and the consumed current are reduced, whereby power usage efficiency may be improved.

While exemplary embodiments have been shown and described above, it will be apparent to those skilled in the art that modifications and variations could be made without departing from the spirit and scope of the present disclosure as defined by the appended claims.

What is claimed is:
1. A charging apparatus comprising:
 a power supply unit supplying charging power;
 a charging unit transferring the charging power from the power supply unit to an external charging target device;
 a charge controlling unit controlling a charging state of the charging unit;
 a display unit displaying the charging state based on a control by the charge controlling unit and stopping a displaying operation when the charging target device is in a fully-charged state; and
 a delaying unit blocking a current supplied to the display unit and delaying the stopping of the displaying operation of the display unit for a preset time when the charging target device is recharged in the fully-charged state,
 wherein the display unit is a monochromatic light emitting diode,
 wherein the delaying unit comprises:
  a switch connected between a cathode of the monochromatic light emitting diode supplied with driving power and a ground in series;

a first resistor connected between a first control signal of the charge controlling unit and a drain of the switch;

a diode connected between the drain of the switch and the first resistor to transfer the control signal;

a second resistor connected between a second control signal of the charge controlling unit and a gate of the switch;

a capacitor connected between the gate of the switch and the second resistor; and a third resistor connected between the gate of the switch and the ground, and wherein the second resistor, the third resistor, and the capacitor determine the delay time together with a gate-source threshold voltage of the switch.

2. The charging apparatus of claim 1, further comprising a detecting unit detecting a state of the charging power transferred from the power supply unit to the charging unit.

3. The charging apparatus of claim 1, wherein the display unit emits light having a preset color while the charging target device is being charged and stops a light emission operation when the charging target device is fully charged.

4. A wireless charging apparatus comprising:

a power supply unit supplying charging power;

a charging unit transferring the charging power from the power supply unit to an external charging target device in a preset wireless scheme;

a charge controlling unit controlling a charging state of the charging unit;

a display unit displaying the charging state according to controlling by the charge controlling unit and stopping a displaying operation when the charging target device is in a fully-charged state; and a delaying unit blocking a current supplied to the display unit and delaying the stopping of the displaying operation of the display unit for a preset time when the charging target device is recharged and is in the fully-charged state, wherein the display unit is a monochromatic light emitting diode, wherein the delaying unit comprises:

a switch connected between a cathode of the monochromatic light emitting diode supplied with driving power and a ground in series;

a first resistor connected between a first control signal of the charge controlling unit and a drain of the switch;

a diode connected between the drain of the switch and the first resistor to transfer the control signal;

a second resistor connected between a second control signal of the charge controlling unit and a gate of the switch;

a capacitor connected between the gate of the switch and the second resistor; and a third resistor connected between the gate of the switch and the ground, and wherein the second resistor, the third resistor, and the capacitor determine the delay time together with a gate-source threshold voltage of the switch.

5. The wireless charging apparatus of claim 4, wherein the charging unit comprises:

a coil unit transferring the charging power to the charging target device according to a magnetic induction effect; and a switching unit controlling a power transfer operation of the coil unit.

6. The wireless charging apparatus of claim 4, further comprising a detecting unit detecting a state of the charging power transferred from the power supply unit to the charging unit.

7. The wireless charging apparatus of claim 4, wherein the display unit emits light having a preset color while the charging target device is being charged and stops a light emission operation when the charging target device is fully charged.

* * * * *